United States Patent [19]
Fimbres

[11] Patent Number: 5,908,179
[45] Date of Patent: Jun. 1, 1999

[54] LIGHTED VALANCE

[76] Inventor: Ralph Fimbres, 36505 Florida, Hemet, Calif. 92545

[21] Appl. No.: 08/805,275

[22] Filed: Feb. 25, 1997

[51] Int. Cl.⁶ ........................................................ F16L 3/00
[52] U.S. Cl. ................................ 248/51; 160/10; 160/38; 160/178.1; 248/74.1; 362/145; 362/151
[58] Field of Search ..................................... 248/251, 261, 248/266, 273, 74.1; 160/19, 38, 39, 10, 127, 178.1; 362/145, 151, 152

[56] References Cited

U.S. PATENT DOCUMENTS

| | | | |
|---|---|---|---|
| 2,564,865 | 8/1951 | Turner et al. | 362/151 |
| 2,662,163 | 12/1953 | Mollner | 362/151 |
| 2,708,711 | 5/1955 | McGinty | 362/151 |
| 5,407,162 | 4/1995 | Manger | 248/251 |
| 5,669,709 | 9/1997 | Adams | 362/145 X |

*Primary Examiner*—Ramon O. Ramirez
*Attorney, Agent, or Firm*—Graham & James LLP

[57] ABSTRACT

A special connector for use with a drapery headrail incorporates an attachment clamp for flexible tubular lighting devices at one end of the connector. At the opposite end the connector incorporated a protuberance or some other structure for removably interacting with the headrail (i.e., the protuberance snaps into a channel or groove on the head rail). The connector may also incorporate a clamp to grasp a valance and thus act as an improved valance clip which is removably attachable to the drapery headrail and to the valance and also incorporates a device to hold a length of flexible tube accent lighting. The clips may be readily rearranged on the head rail to prevent drooping of the flexible tube or to create complex patterns with the tube. The flexible tube may be readily removed for replacement of defective elements. Clips can be available in different configurations so that the accent lighting is most prominent on the valance, most prominent on the drapery or is even aimed upwards towards the ceiling. Modified head rails may incorporate a channel that acts as a clamp to hold the tubular accent lighting.

5 Claims, 1 Drawing Sheet

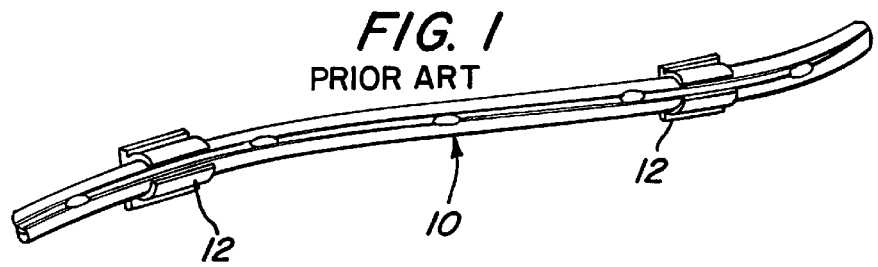
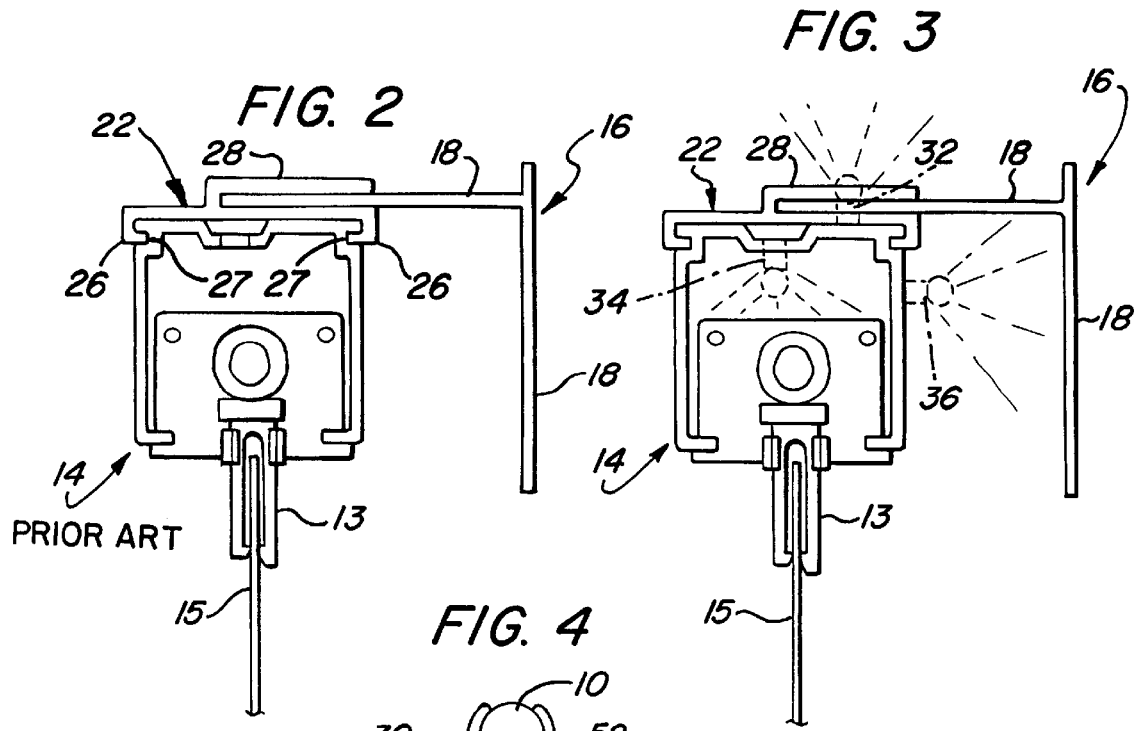
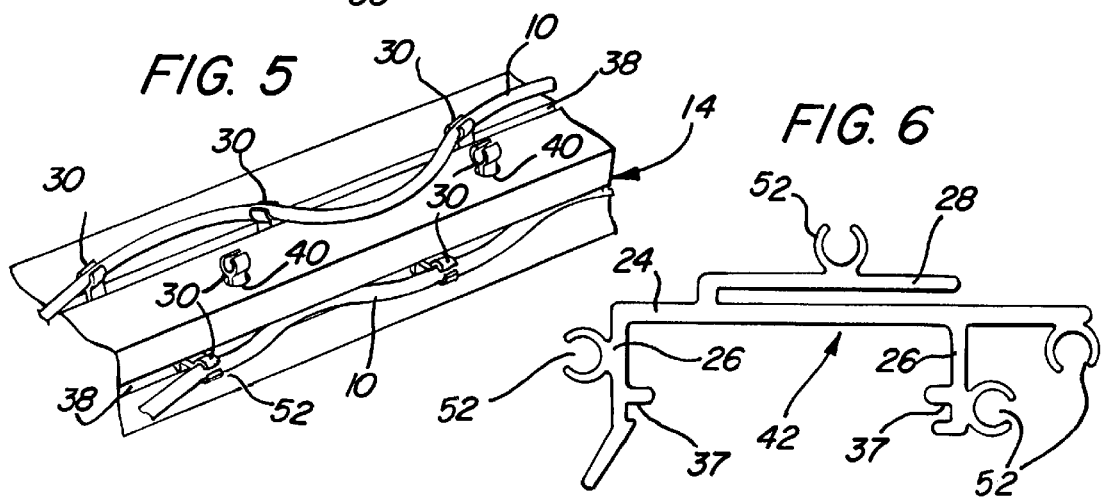

LIGHTED VALANCE

BACKGROUND OF THE INVENTION

1. Field of the Invention

The present invention concerns the field of shades and drapery and more particularly to a device for simplifying the application of illumination to valances.

2. Description of Related Art

The idea of adding a source of illumination to shades and drapery is probably as old as electric illumination which possible the addition of light without the danger of fire. The valance surrounding and concealing a drapery rod and mechanism seemed the ideal vehicle for also hiding electric lights. The early attempts to illuminate drapery tended to treat the drapery as just another light fixture. That is, the valence was used to hide relatively large electric lamps which were intended to illuminate both the drapery and pictures or the immediate portion of the room. For example, see U.S. Pat. Nos. 2,528,132 to Gibson et al. and 2,564,865 to Turner et. al. Also typical of this approach is U.S. Pat. No. 2,569,518 to Deutsch et al. which discloses a valance-like enclosure for fluorescent tubes and U.S. Pat. No. 2,662,163 to Mollner which discloses a combination curtain rod and tubular fluorescent lamp fixture. In the same vein is U.S. Pat. No. 2,708,711 to McGinty et al. which discloses fluorescent tubes and incandescent flood lamps concealed behind a drapery valance.

More recently interior designers have become aware of the usefulness of "accent lighting" in which a plurality of relatively dim electric lights create a pattern of interesting shadows or appear like twinkling stars. Accent lighting is not intended to produce significant room illumination for reading, etc. although it may serve as a safety role as well as a decorative role by making structures visible to prevent collisions in a darkened room, etc. The present inventor has been involved in providing ornamental designs for such accent lighting. For example, see U.S. Pat. D-365,955 which shows a possible ornamental effect of lighting on a valance.

One currently popular method of creating such accent lighting is to employ a plurality of tiny, low-voltage incandescent lamps, often in some type of flexible transparent tube. For example, see U.S. Pat. Nos. 3,755,663 to George, Jr. and 4,812,956 to Chen which disclose, respectively, a flexible transparent tube containing a double parallel string of lamps, and a flexible tube with lamp strings enclosed in an exterior groove. Another flexible tube device, disclosed in U.S. Pat. No. 4,665,470 to George, Jr., incorporates a transparent gel to surround and cushion the tiny lamps.

Closely related lighting devices are flexible tapes taught, for example, in U.S. Pat. No. 4,471,412 to Mori which discloses a flexible tape device containing a plurality of illumination elements and U.S. Pat. No. 4,761,720 to Solow which includes LEDs (light emitting diodes) in a tape; these tapes may be applied to a wide range of objects by merely peeling off a protective backing. Significant drawbacks to this type of installation are that the adhesive generally fails in time (resulting in drooping or total detachment of the illuminated tape) and that the tapes are almost impossible to remove cleanly for repositioning or replacement of failed lamps.

Flexible tube devices 10 may be readily attached to surfaces with U-shaped clamps 12 as shown in FIG. 1. The U-shaped clamps 12 are available with peel and stick adhesive or may be attached with screws or nails (not shown). Although these clamps 12 and similar devices allow ready installation in a wide variety of locations, they generally suffer from adhesive failure with time, and an inability to readily reposition the clamps 12. Further applying screws or nails to the relatively tiny clamps 12 may be extremely tedious.

Despite the apparent ease of using various flexible light tubes or tapes to apply accent lighting, a number of more specialized fixtures have recently been developed. Most probably there is a desire to make the installation more permanent and less messy since tapes can readily become detached and flexible tubes may sag and appear somewhat sloppy. Although low voltage lamps last a very long time, they eventually fail and must be replaced, and may of the tube and tape designs make this replacement very difficult or impossible. U.S. Pat. No. 4,158,221 to Agabekov shows a rigid elongated fixture to accommodate elongated tubular incandescent lamps. This fixture is fairly complex but allows ready replacement of single lamps when they fail. U.S. Pat. No. 5,260,859 to Lettenmayer discloses another elongate fixture for use with similar, low voltage tubular incandescent lamps. While U.S. Pat. No. 5,404,279 to Wood discloses a fixture in which individual screw-based lamps can be readily replaced. While these and similar fixtures may provide a way for applying neat and replaceable accent lighting to draperies, they are expensive and not readily adaptable to a wide range of decors.

OBJECTS AND SUMMARY OF THE INVENTION

It is an object of the present invention to provide a device which permits ready application of accent lighting to drapery fixtures;

It is an additional object of the present invention that the accent lighting device be readily removable for replacement of failed elements; and It is a further object of the present application that attachments for the accent lighting be readily repositionable as desire.

These and further objects are met either in a special connector for use with a drapery head rail. At one end the connector incorporates an attachment clamp for flexible tubular lighting devices. At the opposite end the connector incorporated a protuberance or some other device for removably interacting with the headrail (i.e., the protuberance snaps into a channel or groove on the head rail. The connector may also incorporate a clamp to grasp a valance and thus act as an improved valance clip which is removably attachable to the drapery headrail and to the valance and incorporates a device to hold a length of flexible tube accent lighting. The clips may be readily rearranged on the head rail to prevent drooping of the flexible tube or to create complex patterns of the tube. The flexible tube may be readily removed for replacement of defective elements. Clips are available in different configurations so that the accent lighting is most prominent on the valance, most prominent on the drapery or is even aimed upwards towards the ceiling. Modified head rails may incorporate a channel that acts as a clamp to hold the tubular accent lighting.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows a prior art flexible tube lighting system attached with a U-shaped clamp;

FIG. 2 shows a prior art valance and headrail;

FIG. 3 is a diagrammatic representation of different possible accent light placements;

FIG. 4 shows a simple connection arm/clamp;

FIG. 5 shows variations of the arm/clamp being used to vary the lighting design; and FIG. 6 show an embodiment of the arm/clam wherein there are multiple arms and multiple clamps.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide special valance clips or headrails for adding accent lighting to drapery valances.

FIG. 2 illustrates a prior drapery headrail 14 and attached valence 16. The head rail 14 is usually an extrusion of aluminum. It provides a track for drapery clips in a traditional cloth drapery or for vane clips 13 from which are suspended vanes 15 in a vertical blind. In either case the headrail 14 is usually disguised by the valence 16 which basically consists of two flat panels 18 joined at right angles. The valance 16 is removably attached to the headrail by a series of valence clips 22.

Each valance clip 22 comprises an elongate body 24 which spans the width of the headrail 14. Projecting from this body 24 are two or more connection arms 26 which are shaped to engage complementary structures 27 on the head rail. The exact shape and spacing of the connection arms 26 and their complementary structures 27 vary considerably depending on headrail design and do not form a part of the present invention.

A valance retainer 28 is generally borne on the upper surface (i.e., away from the headrail) of the clip body 24. The retainer 28 acts to removable retain one of the valance panels 18 when inserted therein. Generally the valence clips 22 are free to slide longitudinally along the headrail so that the required number of clips 22 to support a given valance can be readily inserted onto the head rail 14 and adjusted as necessary.

Up until now flexible tube accent lights 10 have been variously attached to the headrail or valence with U-shaped clamps 12 of the type discussed in relation to FIG. 1. This method is messy and inconvenient. The U-clamps 12 are difficult to reposition to obtain different lighting effects. It will be appreciated that there are a number of different positions in which the accent light 10 can be advantageously placed. Referring to FIG. 3 the phantomed light bulbs and rays represent the pattern of light beams emanating from accent lights placed in various positions. Lights 32 placed on an upper surface of the headrail 14 will generally throw light towards the ceiling projecting an attractive pattern on it. Lights 34 facing downward will generally project light trough the headrail and onto the drapery or blinds below. Similarly, light 36 placed on a front facing surface of the headrail will illuminate the valance 16 and the drapery.

Rather than adhesive or screws to attach a U-shaped clamp 12 for retaining accent lights 10, the present invention provides a U-shaped clamp 52 attached to one of the connection arms 26. The simplest version is a single arm 26 per clamp 52 forms an arm/clamp 30 as shown in FIG. 4. In FIG. 4 the connection arm 26 bears protuberances 37 which fits into a complementary groove 38 or aperture 40 on the head rail 14. This allows the connection arm 26 to be readily snapped into the aperture 40 or into the head rail groove 38 and be easily slid along the groove to effect ideal placement. Grooves 38 can be readily provided for any of the light placements discussed in relation to FIG. 3 as well as other positions not illustrated. It is a simple matter to inset and reposition the connection arms 26, and with them their attached U-shaped clamps 52. It will be readily apparent that multiple apertures 40 or more than one groove 38 can be readily provided allowing choice of position or even use of multiple accent light tubes 10. It will also be readily apparent that means in which the connection arm 26 interacts with the complementary structure 27 covers a wide range of possibilities (i.e., the headrail 14 might bear a protuberance sized to interact with a groove in the connection arm 26, etc.).

In the very simplest situation the connection arm 26 and the complementary structure can be collapsed together by pressing the accent light 10 directly into the groove 38. While this alternative embodiment reduces the number of necessary parts, it is not as flexible as the preferred connection arm/clamp design. It is generally necessary that a significant length of the flexible accent light 10 be inserted into the groove 38 to ensure adequate retention (see FIG. 5). This causes some of the light to be blocked by the opaque material of the headrail 14. Further, this total insertion makes it more difficult to remove the accent light 10 for replacement purposes and also makes it impossible to loop or drape the accent light 10. However, it is possible to combine arm/clamps 30 with insertion into the groove 38 as shown in FIG. 5.

In FIG. 5 a variety of different arm/clamps 30 are illustrated inserted into grooves 38 or apertures 40, thereby enabling the creation of a considerable range of unique lighting patterns. The illustrated arm/clamps 30 are shown with their clamps 52 aligned at various angles with the long axis of the head rail. Depending on the precise design of the mechanism attaching the arm/clamp 30 to the head rail 14 the arm/clamps 30 may be easily reoriented in regards to the long axis of the head rail 14 (e.g. by twisting), but with some designs the arm/clamps 30 have a fixed relation to the long axis so that device with different orientations are manufactured and the end user chooses the appropriate orientations for a given application.

It is also possible to produce multiple structures in which the arm/clamp 30 has multiple arms and multiple clamps. One possible design for such a structure is shown in FIG. 6 in the form of a modified valance clip 42. Here, there are conceptually two connection arms 26 connected by the clip body 24. The clip includes molded in U-shaped clamps 52 positioned to aim light up, down or other directions. One clip 42 may have multiple U-shaped clamps 12. Alternatively, clips 42 with only a single clamp 52 may be provided. In this case it is a simple matter to use clips of several different clamp positions on a single headrail 14 to obtain special effects and/or enable use of multiple accent light 10 strings. There is, of course, nothing to preclude the production of a headrail design that includes apertures 40 and grooves 38 for use with simple arm/clamps 30 or directly with accent light 10 which, at the same time, is also used with the modified valance clip 42.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for adding accent light to a drapery headrail comprising:

a connector comprising:

accent light retention means for removably holding an elongate accent light string;

headrail interaction means for removably snap fitting to a drapery headrail without adhesive; and and a member for connecting the retention means to the interaction means; and complementary means on the drapery headrail for accepting the interaction means to removably attach the connector to the headrail.

2. The system of claim 1, wherein the connector further comprises valance retaining means for attaching a valance.

3. The system of claim 1, wherein the accent light retention means comprises a substantially U-shaped clamp.

4. The system of claim 3, wherein the U-shaped clamp is oriented with its long axis substantially parallel to the long axis of the headrail.

5. The system of claim 3, wherein the U-shaped clamp is oriented with its long axis substantially perpendicular to the long axis of the headrail.

* * * * *